United States Patent
Li et al.

(10) Patent No.: US 11,466,988 B2
(45) Date of Patent: Oct. 11, 2022

(54) METHOD AND DEVICE FOR EXTRACTING KEY FRAMES IN SIMULTANEOUS LOCALIZATION AND MAPPING AND SMART DEVICE

(71) Applicant: GOERTEK INC., Weifang (CN)

(72) Inventors: Baoming Li, Weifang (CN); Shanshan Min, Weifang (CN); Shunran Di, Weifang (CN); Libing Zou, Weifang (CN); Jinxi Cao, Weifang (CN)

(73) Assignee: GOERTEK INC., Weifang (CN)

( * ) Notice: Subject to any disclaimer, the term of this patent is extended or adjusted under 35 U.S.C. 154(b) by 208 days.

(21) Appl. No.: 16/631,920

(22) PCT Filed: Jul. 31, 2019

(86) PCT No.: PCT/CN2019/098649
§ 371 (c)(1),
(2) Date: Jan. 17, 2020

(87) PCT Pub. No.: WO2020/119140
PCT Pub. Date: Jun. 18, 2020

(65) Prior Publication Data
US 2021/0223046 A1 Jul. 22, 2021

(30) Foreign Application Priority Data
Dec. 13, 2018 (CN) .......................... 201811525307.8

(51) Int. Cl.
G01C 21/00 (2006.01)
G01S 17/86 (2020.01)
G01C 21/20 (2006.01)

(52) U.S. Cl.
CPC ........... *G01C 21/005* (2013.01); *G01C 21/20* (2013.01); *G01C 21/3848* (2020.08); *G01S 17/86* (2020.01)

(58) Field of Classification Search
CPC ........ G01C 21/32; G01C 21/12; G01C 21/20; G01C 21/3848; G01C 21/005;
(Continued)

(56) References Cited

U.S. PATENT DOCUMENTS

| 10,262,190 B2 | 4/2019 | He |
| 2005/0200762 A1 | 9/2005 | Barletta et al. |

(Continued)

FOREIGN PATENT DOCUMENTS

| CN | 101520898 A | 9/2009 |
| CN | 105160686 A | 12/2015 |

(Continued)

OTHER PUBLICATIONS

Translation of Lin, Xiang-kai, et al. Re-Locating Method, Device, Equipment and Storage Medium of the Camera Pose Tracking Process. CN 108615247 A ed., 2018. (Year: 2018).*

(Continued)

*Primary Examiner* — Kenneth J Malkowski
*Assistant Examiner* — Carville Albert Hollingsworth, IV
(74) *Attorney, Agent, or Firm* — Buchanan Ingersoll & Rooney PC (57) ABSTRACT

A method and device for extracting key frames in simultaneous localization and mapping and a smart device. The method includes acquiring an image frame from an image library storing a plurality of image frames of an unknown environment, and performing feature extraction on the image frame to obtain information of feature points, wherein the information includes a quantity of feature points; acquiring relative motion information of the image frame relative to the previous key frame, and calculating an adaptive threshold currently used by using the relative motion information; and selecting a key frame according to the infor-
(Continued)

mation of feature points and the adaptive threshold indicating space information of image frames.

7 Claims, 3 Drawing Sheets

(58) Field of Classification Search
CPC .............. G01C 21/165; G01C 21/1656; G01C 21/3807; G05D 1/0088; G05D 1/024; G05D 1/027; G05D 1/0274; G06T 2207/10016; G06T 2207/30244; G06T 7/579; G06T 7/73; G06T 15/00; G06T 2207/10028; G06T 2207/10032; G06T 7/20; G01S 17/86
See application file for complete search history.

(56) References Cited

U.S. PATENT DOCUMENTS

| | | | |
|---|---|---|---|
| 2015/0239477 A1 | 8/2015 | Kitagawa | |
| 2017/0261985 A1* | 9/2017 | Maeno | ................ G05D 1/0274 |

FOREIGN PATENT DOCUMENTS

| | | | | | |
|---|---|---|---|---|---|
| CN | 105518709 | A | | 4/2016 | |
| CN | 107330376 | A | | 11/2017 | |
| CN | 107705254 | A | | 2/2018 | |
| CN | 107748569 | A | | 3/2018 | |
| CN | 107844779 | A | | 3/2018 | |
| CN | 108335319 | A | | 7/2018 | |
| CN | 108492316 | A | | 9/2018 | |
| CN | 108615247 | A | * | 10/2018 | ............. G06T 7/246 |
| CN | 109579847 | A | | 4/2019 | |
| JP | 2015518188 | A | * | 6/2015 | ............... G06T 7/74 |
| WO | WO-2018049581 | A | * | 3/2018 | ............. G06T 7/246 |
| WO | WO-2018214706 | A1 | * | 11/2018 | ........... G05D 1/0246 |

OTHER PUBLICATIONS

Translation of Chekuwa, Won, et al. Mobile Robot. JP 2015518188 A ed., 2015 (Year: 2015).*
International Search Report (PCT/ISA/210) and Written Opinion (PCT/ISA/237) dated Oct. 29, 2019, by the Chinese Patent Office as the International Searching Authority for International Application No. PCT/CN2019/098649.
W. Yong, "Research and Implementation of Monocular Simultaneous Localization and Sparse Mapping", University of Science and Technology of China, May 2017. (86 pages).
M. Machado et al., "Description and Matching of Acoustic Images Using a Forward Looking Sonar: A Topological Approach", Science Direct, IFAC Papers Online, 2017, pp. 2317-2322.
Office Action dated Jan. 28, 2022, by the Chinese Patent Office in corresponding Chinese Patent Application Mo. 201811525307.8. (6 pages).

* cited by examiner

METHOD AND DEVICE FOR EXTRACTING KEY FRAMES IN SIMULTANEOUS LOCALIZATION AND MAPPING AND SMART DEVICE

CROSS REFERENCE TO RELATED APPLICATIONS

This application is a U.S. National Stage entry under 35 U.S.C. § 371 based on International Application No. PCT/CN2019/098649, filed on Jul. 31, 2019, which claims priority to Chinese Patent Application No. 201811525307.8, filed on Dec. 13, 2018. The embodiment of the priority applications are hereby incorporated herein in their entirety by reference.

TECHNICAL FIELD

The present disclosure relates to the technical field of simultaneous localization and mapping, and in particular, to a method and device for extracting key frames in simultaneous localization and mapping and a smart device.

BACKGROUND

In recent years, equipments such as robots, drones and unmanned vehicles have become increasingly popular, and the SLAM (Simultaneous Localization and Mapping) technology has become well known and been considered as one of the key technologies in these fields. In SLAM, a robot starts out from an unknown position in an unknown environment, locates its own position and attitude in the moving process by map features (such as corners and pillars) repeatedly observed, and then incrementally constructs a map based on its positions, thereby achieving simultaneous localization and mapping.

The main process of simultaneous localization and mapping mainly comprises feature detection and matching, motion estimation, and key frame extraction. It is well known that SLAM can obtain a point cloud map based on the feature points of key frames, and thus the selection of key frames directly affects the construction of point cloud map, and further affects the accuracy of positioning and navigation.

In the key frame extraction process of the existing SLAM, there are problems of key frame redundancy, consuming most of the memory, spatial distribution unevenness of key frames and low positioning accuracy, which need to be solved urgently.

SUMMARY

The present disclosure provides a method and device for extracting key frames in simultaneous localization and mapping and a smart device, which solve the technical problems of redundancy and spatial distribution unevenness of key frames in key frame extraction, and thus improves the accuracy of localization and mapping of the SLAM technology.

According to an aspect of the present disclosure, a method for extracting key frames in simultaneous localization and mapping is provided, and the method comprises:

acquiring an image frame from an image library storing a plurality of image frames of an unknown environment, and performing feature extraction on the image frame to obtain information of feature points, wherein the information includes a quantity of feature points;

acquiring relative motion information of the image frame relative to the previous key frame, and calculating an adaptive threshold currently used by using the relative motion information; and selecting a key frame according to the information of feature points and the adaptive threshold indicating space information of image frames.

According to another aspect of the present disclosure, a device for extracting key frames in simultaneous localization and mapping is provided, and the device comprises:

a feature extraction module for acquiring an image frame from an image library storing a plurality of image frames of an unknown environment, and performing feature extraction on the image frame to obtain information of feature points, wherein the information includes a quantity of feature points;

a calculation module for acquiring relative motion information of the image frame relative to the previous key frame, and calculating an adaptive threshold currently used by using the relative motion information; and a key frame selecting module for selecting a key frame according to the information of feature points and the adaptive threshold indicating space information of image frames.

According to still another aspect of the present disclosure, a smart device is provided, and the smart device comprises: a device body; and the device for extracting key frames in simultaneous localization and mapping according to the another aspect of the present disclosure; wherein at least one wheel for moving is mounted at a bottom of the device body, and a sensor connected to the key frame extraction device is provided on the device body;

the sensor comprises a vision sensor which collects an image of an unknown environment to obtain an image frame, stores the image frame acquired into an image library, and sends a corresponding image frame to the key frame extraction device; and the sensor comprises a motion sensor which acquires relative motion information of the image frame relative to a previous key frame, and sends the relative motion information to the key frame extraction device.

The method and device for extracting key frames in simultaneous localization and mapping according to the embodiments of the present disclosure, calculate the adaptive threshold currently used according to the relative motion information of each image frame relative to the previous key frame, judge whether the image frame is a key frame based on the corresponding adaptive threshold of the image frame. In other words, according to the specific conditions of each image frame, the corresponding adaptive threshold is calculated and used to select the key frame, thereby avoiding the defects of key frame redundancy in key frame extraction probably caused by using a fixed threshold and spatial distribution unevenness, which is beneficial to improving the positioning accuracy. The smart device according to the present disclosure optimizes the key frame extraction, eliminates redundant key frames in the point cloud map, saves system resources and makes key frames in the point cloud map more evenly distributed, thereby improving the accuracy of positioning and navigation as well as the market competitiveness of the smart device.

DETAILED DESCRIPTION

In order to make the objects, technical solutions and advantages of the present disclosure clearer, the present disclosure will be further described in detail with reference to the accompanying drawings and specific embodiments. Apparently, the embodiments described are merely some but not all of embodiments of the present disclosure. All other embodiments obtained by those skilled in the art based on the embodiments of the present disclosure without paying any creative efforts shall fall within the protection scope of the present disclosure.

SLAM (Simultaneous Localization And Mapping) is a technology in which a mobile device such as a robot whose position is uncertain constructs a map and simultaneously uses the map for autonomous positioning and navigation in a completely unknown environment. SLAM can be understood as that a robot starts to move from an unknown position in an unknown environment, locates its own position in the moving process according to position estimation and sensor data, and simultaneously constructs an incremental map.

The existing SLAM has the problems of redundancy and spatial distribution unevenness of key frames in the key frame extraction. For example, in the SLAM mapping process, if a pause occurs at a certain point, the key frame of this point will be repeatedly extracted, leading to redundancy and most of the memory being consumed; on the other hand, when the robot moves vigorously, feature points matched will be few and thus the quantity of key frames extracted will be insufficient, which affects the positioning accuracy.

The design concept of the present disclosure is as follows. In view of the above technical problems, the present disclosure provides a method and device for extracting key frames in simultaneous localization and mapping in which, by introducing relative motion information of each image frame relative to the previous key frame, calculating an adaptive threshold currently used by using the relative motion information, and judging whether the image frame is a key frame according to the corresponding adaptive threshold, the technical problems of key frame redundancy and key frame insufficiency in some scenarios, i.e., uneven spatial distribution of key frames, in the existing key frame extraction can be avoided, thereby improving the accuracy of positioning and navigation and satisfying actual needs.

Figure 1:
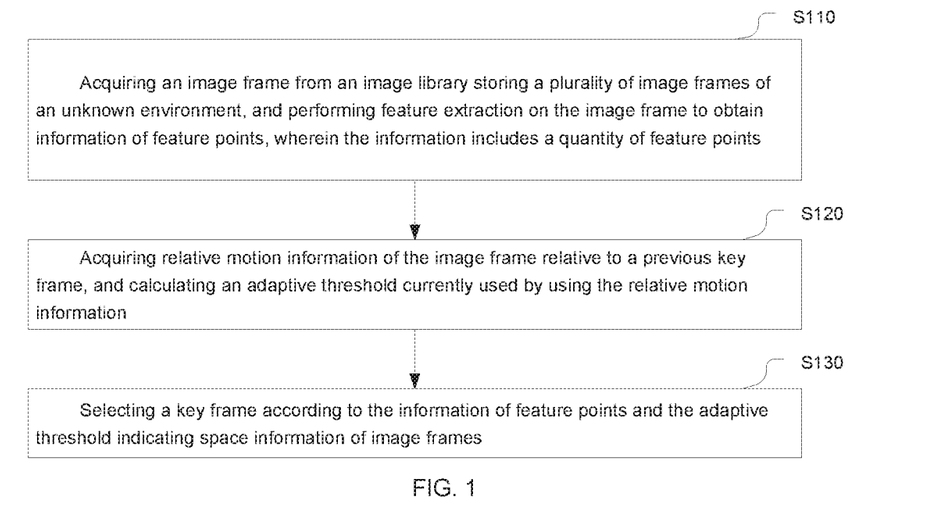
FIG. 1 is a schematic flow chart of a method for extracting key frames in simultaneous localization and mapping according to an embodiment of the present disclosure.

FIG. 1 is a schematic flowchart of a method for extracting key frames in simultaneous localization and mapping according to an embodiment of the present disclosure. Referring to FIG. 1, the method for extracting key frames in simultaneous localization and mapping of the present embodiment comprises the following steps.

In Step S110, an image frame is acquired from an image library storing a plurality of image frames of an unknown environment, and feature extraction is perform on the image frame to obtain information of feature points. The information includes a quantity of feature points.

In Step S120, relative motion information of the image frame relative to a previous key frame is acquired, and an adaptive threshold currently used is calculated by using the relative motion information.

In the present embodiment, relative position information (spatial information) is used as one index for extracting a key frame. In an embodiment, the relative position information can be obtained by conversion using a pose value of the current time point and a pose value of the time point of the previous key frame of the smart device.

In Step S130, a key frame is selected according to the information of feature points and the adaptive threshold indicating space information of image frames.

As shown in FIG. 1, in the method for extracting key frames in simultaneous localization and mapping of the present embodiment, with respect to a frame of acquired image to be judged, relative motion information of the frame relative to the previous key frame is acquired, and an adaptive threshold currently used is calculated by using the relative motion information; subsequently, a key frame is determined by selecting according to the feature points extracted on the frame (specifically, quantity information of the feature points) and the calculated adaptive threshold. Compared with the prior art, on the one hand, the adaptive thresholds corresponding to different frames are different, thereby avoiding the problem of insufficiency of key frames at a part of positions caused by using a fixed threshold, which affects the positioning accuracy. On the other hand, calculating the adaptive threshold by using relative motion information also avoids the problem of key frame redundancy caused by repeatedly extracting key frames when a pause occurs, such that system resources are saved, and the spatial distribution of the extracted key frames is evener, thereby improving the accuracy of positioning and navigation in SLAM.

The implementation steps of the method for extracting key frames in simultaneous localization and mapping of the present disclosure will be described below in conjunction with a specific application scenario.

It will be described herein as an example when the method for extracting key frames in simultaneous localization and mapping is applied to a smart device running the SLAM system. It should be noted that the smart device is a mobile device, such as a mobile robot, an unmanned vehicle and a drone. In order to achieve simultaneous localization and mapping, the smart device is at least provided with a vision sensor to collect image data in an unknown environment for subsequent positioning and navigation.

The vision sensor herein is, for example, a monocular camera, a binocular camera or an RGB-D camera. Whichever type of camera is used, it is to collect color images and depth images. The camera to be used should be selected according to specific needs in practical applications, which is not limited in the present embodiment.

In order to reduce the positioning error based on the vision sensor data, the smart device of the present embodiment is further provided with an inertial measurement unit (IMU) for collecting acceleration information and angular velocity information of the motion of the smart device, and an encoding disk sensor for collecting angular displacement information of the motion of the smart device. In other words, the method of the present embodiment acquires IMU data, encoding disk data, and image data by an IMU sensor, an encoding disk sensor, and a vision sensor (such as a camera), respectively.

Figure 2:
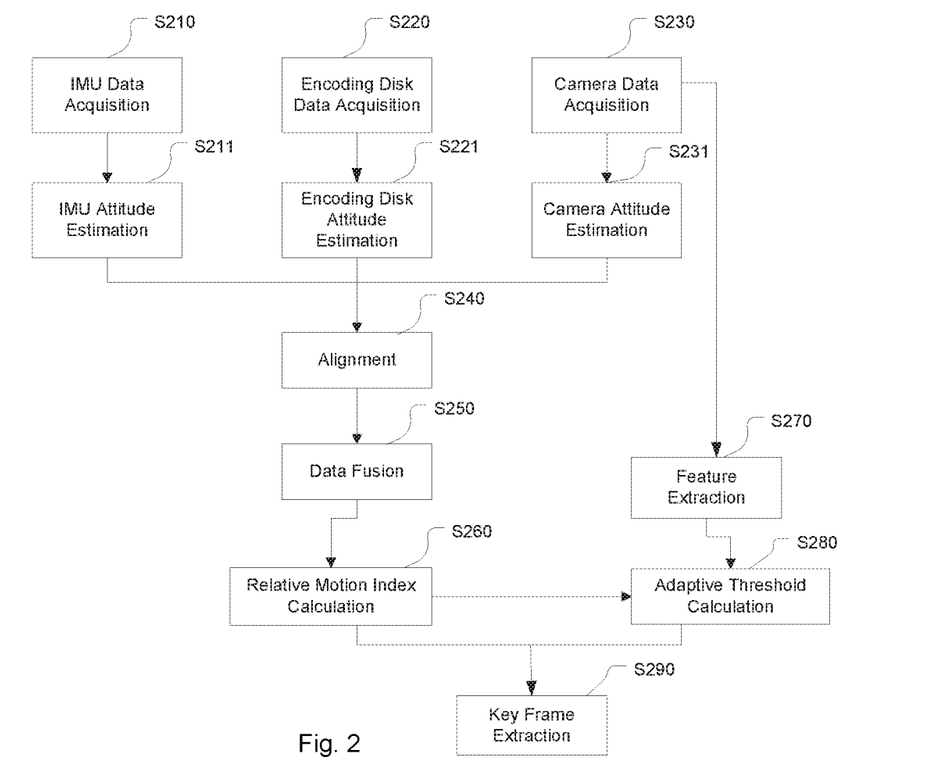
FIG. 2 is a flow chart of a method for extracting key frames in simultaneous localization and mapping according to another embodiment of the present disclosure.

Referring to FIG. 2, the method for extracting key frames in simultaneous localization and mapping of the present embodiment mainly comprises the following steps: data collection, data fusion, relative motion calculation, feature information extraction, and key frame extraction.

Data collection comprises acquiring three-axis acceleration data and three-axis angular velocity data of the smart device, acquiring angular displacement data of the smart device, and acquiring an image frame collected by the smart device. Acquiring three-axis acceleration data and three-axis angular velocity data may be, for example, acquiring collected three-axis acceleration data and three-axis angular velocity data from an inertial measurement unit mounted on the smart device. Acquiring angular displacement data may comprises: acquiring collected angular displacement data from an encoding disk sensor mounted on the smart device Acquiring an image frame collected by the smart device may be, for example, acquiring collected image frame from a vision sensor mounted on the smart device.

Data collection and acquisition will be described in conjunction with FIG. 2.

In Step S210, IMU data is acquired.

Herein the data acquired is data collected by the inertial measurement unit IMU. A typical IMU is a device for measuring the three-axis attitude angle (or angular velocity) and acceleration of an object using an accelerometer and a gyroscope. The accelerometer detects acceleration signals on independent three axes in the body coordinate system of the object, the gyroscope detects the angular velocity signal of the body relative to the navigation coordinate system, and the angular velocity and acceleration of the object in the three-dimensional space is measured, thereby resolving the attitude of the object. In order to improve its reliability, in addition to the accelerometer and the gyroscope, a magnetometer may be added to the IMU to form a 9-axis IMU. In the present embodiment, acquiring IMU data is, for example, acquiring data collected by a three-axis accelerometer and data collected by a three-axis gyroscope.

In Step S220, encoding disk data is acquired.

In other words, the data collected by the encoding disk sensor is acquired. The encoding disk sensor is a displacement sensor measuring the angular position of the shaft.

By mounting an encoding disk on the rotating shaft of the wheels (such as the symmetrical left and right driving wheels) of the smart device, the travelled distance of the left and right wheels can be obtained. According to the two-wheel differential control theory, the position information and angle information of the smart device can be further obtained. The encoding disk sensor is usually in the form of a photoelectric code disk.

In Step S230, camera data is acquired.

In this step, specifically, image data collected by a vision sensor (such as a camera) mounted on the smart device is acquired.

After acquiring the data collected by the three kinds of sensors, the pose estimation values can be obtained by performing attitude estimation respectively.

In Step S211, IMU attitude estimation is performed.

According to the triaxial angular velocity and the triaxial acceleration collected by the IMU, the position information and angle information of the smart device can be obtained by an integral operation with respect to time. The attitude estimation belongs to the prior art and can be implemented by conventional technologies. For ease of understanding, it will be briefly described below in conjunction with FIG. 3.

Figure 3:
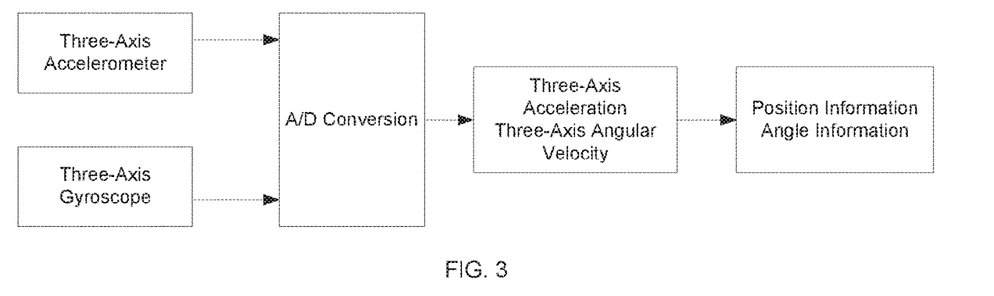
FIG. 3 is a schematic flow chart of IMU attitude estimation in FIG. 2.

The data collected by the three-axis accelerometer and the three-axis gyroscope is acquired. A/D (analog-to-digital) conversion is performed on the acquired data to obtain three-axis acceleration data and three-axis angular velocity data. Then attitude resolving is performed on the angular velocity signal collected by the gyroscope. The trigonometric function calculation is performed on the attitude matrix to extract the attitude angle and azimuth angle of the smart device. The linear acceleration measured by the accelerometer is transformed from the body coordinate system to the world coordinate system, and then integrates to obtain parameter information such as speed and position.

In Step S221, encoding disk attitude estimation is performed.

In practical applications, the wheels of the smart device are driven by a DC motor, and the motor is equipped with an encoder, so that the rotation speed of the wheels can be measured and the travelled distance of the wheels can be calculated. Referring to FIG. 3, the encoding disk attitude estimation comprises: acquiring data of the encoding disk mounted on the rotating shaft of the left wheel (i.e., the left wheel encoding disk), acquiring data of the encoding disk mounted on the rotating shaft of the right wheel (i.e., the right wheel encoding disk), and inputting the acquired data into a decoder to decode and obtain the left wheel travelled distance and the right wheel travelled distance respectively. The position information and angle information of the smart device can be further calculated by the two-wheel differential control algorithm.

In Step S231, camera attitude estimation is performed.

Figure 4:
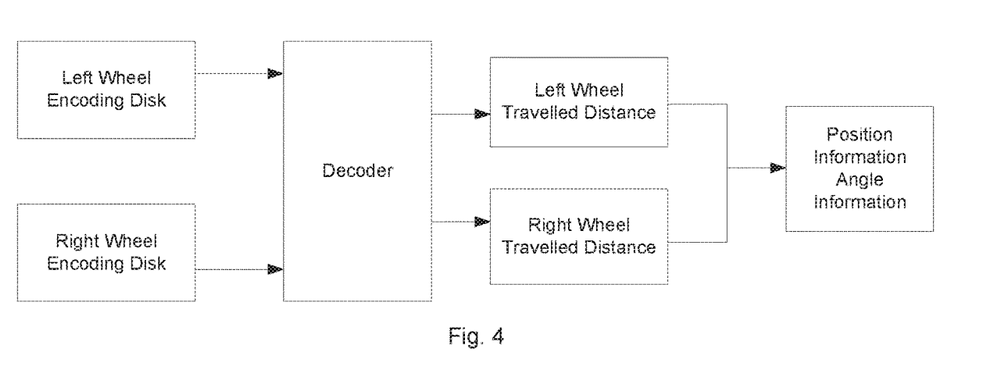
FIG. 4 is a schematic flow chart of encoding disk attitude estimation in FIG. 2.
Figure 5:
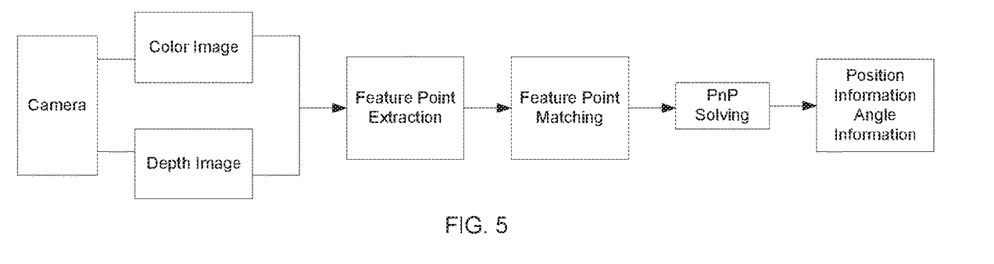
FIG. 5 is a schematic flow chart of camera attitude estimation in FIG. 2.

Referring to FIG. 4, the camera attitude estimation mainly comprises acquiring the color image and the depth image collected by the camera. Then feature points of the image are extracted, feature point matching is performed on the extracted feature points, and then PnP algorithm is used to calculate and obtain the pose (position information and angle information) of the camera. The PnP algorithm calculates the projection relationship between N (N is a natural number) feature points in the world coordinate system and N pixel points in an image, thereby obtaining the pose of the camera.

Subsequently, referring to FIG. 2, after attitude estimation is performed respectively by using the data of the three kinds of sensors, the attitude estimation values are aligned. In other words, the alignment is performed in step S240.

The alignment herein comprises two parts: time alignment and spatial alignment. Specifically, with respect to the three-axis acceleration data, the three-axis angular velocity data and the angular displacement data acquired, time alignment and spatial alignment are performed according to a time stamp of the image frame. Time alignment is to give a time stamp to each frame of data of the sensor. In practice, if the time difference between two frames of the IMU sensor and the encoding disk sensor is less than a preset value, the data of the two sensors are considered to be data of the same time point. In other words, the alignment herein does not require time to be completely consistent, thereby reducing calculation complexity and increasing efficiency. Spatial alignment is to transform each frame of data of the IMU sensor and the encoding disk sensor from a respective reference coordinate system into a fixed world coordinate system.

In the present embodiment, after the time alignment and spatial alignment, the triaxial acceleration data, the triaxial angular velocity data, the angular displacement data and the image frame are fused using a predetermined filtering algorithm to obtain a pose value corresponding to the image frame, the pose value including position information and angle information; a difference between the pose value corresponding to the image frame and a pose value of the previous key frame is calculated to obtain a position variation and an angle variation from a time point of the previous key frame to a current time point. The detailed process will be explained below.

In Step S250, data fusion is performed.

With respect to the first attitude estimation value calculated based on the IMU data, the second attitude estimation value calculated based on the encoding disk data, and the third attitude estimation value calculated based on the image data, a fusion operation is performed using a data fusion algorithm such as EKF (Extended Kalman Filter), to obtain a fused pose value including position information and angle information.

The fusion of multi-sensor data using a data fusion algorithm belongs to the prior art, and may refer to the description in the prior art, which is not repeated herein.

It should be noted that, after data fusion in the above step, a pose value including position information and angle information corresponding to each image frame can be obtained. A position variation ($\Delta x$, $\Delta y$) and an angle variation ($\Delta \theta$) from the time point of the previous key frame to the current time point are obtained by calculating the difference between the pose value corresponding to the current image frame and the pose value of the previous key frame.

In Step S260, a relative motion index is calculated.

The calculation of the relative motion index is an important content of the present embodiment. The relative motion refers to the spatial motion of the smart device (such as a robot). The relative motion index calculated reflects the motion of the smart device from the time point of the previous key frame to the current time point.

In the present embodiment, a binary function relationship of the relative motion index value related to a third constant, the position variation and the angle variation is determined by using the acquired relative motion information including a position variation and an angle variation, and after calculation, a relative motion index value is obtained. The third constant here is an empirical value for adjusting the distribution of key frames so that more key frames can be extracted when the angle of the smart device changes drastically. Namely, after the relative motion information is obtained by the data fusion in step S250, a vector indicating a rotation relationship between different frames (angle variation), and a vector indicating a translation relationship between different frames (position variation) can be acquired. By cooperation with the third constant, the binary function relationship of the relative motion index value with respect to the position variation and the angle variation is established, and thus the relative motion index value can be calculated. The third constant may be applied to both the position variation and the angle variation. Alternatively, the third constant and a linear relationship including the third constant as well as other constants may be respectively applied to the position variation and the angle variation. Alternatively, the third constant and a linear relationship including the third constant as well as other constants may be applied only to one of the position variation and the angle variation.

Further referring to FIG. 2, the right side of which illustrates another important content of the method of the present embodiment, namely, the calculation of adaptive threshold, which will be described below.

In Step S270, features are extracted.

Herein the feature information is extracted from the image. In other words, those points that remain substantially unchanged as the camera angle changes are looked for in the image. The camera pose and positioning can be estimated through these points. Corners in the image are easier to identify than pixel blocks. Therefore, the feature extraction is mostly extraction and description of corner positions of the image. Corners are positions where the local pixel gray level changes significantly.

Current mainstream features include SIFT (Scale-Invariant Feature Transform), SURF (Speeded Up Robust Features), and FAST (Features From Accelerated Segment Test). SIFT features remain invariant to image changes such as scale, rotation, and a certain change of viewing angle and illumination. SIFT features are highly distinguishable. SURF is an improvement of SIFT. SURF uses Haar wavelet to approximate the gradient operation in SIFT method, and uses the integral graph technique to perform fast calculation. SURF is applied to occasions with strict running time requirements. FAST is mainly used for corner detection. FAST defines a corner as follows: if a pixel point is in an area different from where a sufficient quantity of pixel points in its surrounding area locate, the pixel point may be a corner. As far as a grayscale image is concerned, if the grayscale value of a point is larger or smaller than the grayscale values of a sufficient quantity of pixel points in the surrounding area, the point may be a corner.

It should be noted that no matter which feature is extracted, it is to make the image have sufficient feature information for positioning and navigation.

In the present embodiment, the feature extraction is illustrated by taking the ORB algorithm as an example. ORB uses FAST algorithm to detect feature points, adds directionality to FAST feature points so that the feature points are invariant to rotation, and provides invariance to scale by a method of constructing pyramids.

Figure 6:
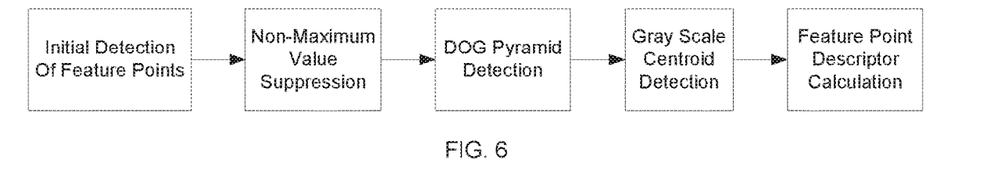
FIG. 6 is a schematic flow chart of feature information extraction in FIG. 2.

Referring to FIG. 6, the ORB feature extraction comprises five steps: initial detection of feature points, non-maximum value suppression, DOG pyramid detection, gray scale centroid detection, and feature point descriptor calculation.

It should be noted that the feature extraction herein belongs to the prior art. More details about the implementation of feature extraction may refer to the description in the prior art, and are not repeated herein.

After the feature extraction of the image frame, information of the feature point is obtained, which includes information such as position and description. In the present embodiment, the quantity information of feature points is mainly addressed.

In Step S280, an adaptive threshold is calculated.

In the present embodiment, a corresponding relative motion index value is calculated by using the relative motion information acquired (see the description in step S260); the adaptive threshold currently used is calculated according to the relative motion index value, a first constant indicating a relative motion index threshold, and a second constant indicating a feature point quantity threshold.

In the present embodiment, the relative position (i.e., spatial information) is used as an index of key frame extraction and is calculated by acquiring the position variation and the angle variation between the time points of the current frame and the previous key frame, and then the adaptive threshold is calculated by using the relative motion index.

Therefore, by setting the adaptive threshold of feature points, the problem that the quantity of feature points matched is small when the robot moves vigorously, and the fixed threshold is likely to cause failure of key frame extraction (in other words, the quantity of extracted key frames is insufficient) can be solved. Moreover, when the relative motion is used as an index for key frame extraction, the positioning accuracy is improved. For example, in positioning, the position of the smart device on the map is judged by matching the similarity of the feature points in the key frames of the point cloud map, and the even spatial distribution of key frames on the point cloud map ensures accurate positioning.

In step S290, a key frame is extracted.

It can be understood that the key frames selected are used for constructing the point cloud map in SLAM, so the richness of the feature points in key frames affects the positioning accuracy.

In order to meet the requirements of global positioning, in the present embodiment, the distribution of key frames of the point cloud map is adjusted to be as even as possible, and the quantity of key frames are increased at positions where the angle changes much, such as corners of the map, thereby improving the positioning accuracy.

Specifically, the process of extracting a key frame is as follows: judging whether the quantity of feature points is greater than a corresponding adaptive threshold; if the quantity of feature points is greater than the corresponding adaptive threshold, determining that the image frame is a preliminary key frame; and if the quantity of feature points is not greater than the corresponding adaptive threshold, determining that the image frame is not a key frame. The quantity of feature points is obtained in step S270, and the adaptive threshold is calculated in step S280.

Further, in order to ensure the even distribution of key frames, in the present embodiment, with respect to the preliminary key frame determined, a corresponding relative motion index value is calculated by using the relative motion information acquired. It is judged whether the corresponding relative motion index value of the preliminary key frame is greater than a preset index threshold; if yes, it is determined that the preliminary key frame is a final key frame; and if not, it is determined that the preliminary key frame is not a key frame. In other words, if the relative motion index value corresponding to the preliminary key frame is greater than a preset index threshold, it is determined that the preliminary key frame is the final key frame, and is added to the key frame library; if the relative motion index value corresponding to the preliminary key frame is less than or equal to the preset index threshold, it is determined that the preliminary key frame is not a key frame.

In sum, in the embodiments of the present disclosure, the relative motion index value and the adaptive threshold are calculated and used to select the key frame, thereby optimizing the key frame extraction, eliminating redundant key frames in the SLAM point cloud map, saving the system resources, making the key frame distribution in the point cloud map evener, and improving the positioning and navigation accuracy.

The present disclosure further provides a device for extracting key frames in simultaneous localization and mapping, which belongs to a single inventive concept with the method for extracting key frames in simultaneous localization and mapping as described above.

Figure 7:
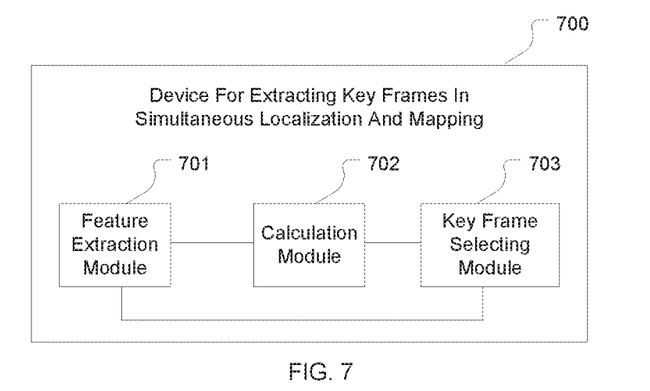
FIG. 7 is a block diagram of a device for extracting key frames in simultaneous localization and mapping according to an embodiment of the present disclosure.

Referring to FIG. 7, the device 700 for extracting key frames in simultaneous localization and mapping of the present embodiment comprises:

a feature extraction module 701 for acquiring an image frame from an image library storing a plurality of image frames of an unknown environment, and performing feature extraction on the image frame to obtain information of feature points, wherein the information includes a quantity of feature points;

a calculation module 702 for acquiring relative motion information of the image frame relative to the previous key frame, and calculating an adaptive threshold currently used by using the relative motion information; and a key frame selecting module 703 for selecting a key frame according to the information of feature points and the adaptive threshold indicating space information of image frames.

In an embodiment of the present disclosure, the key frame selecting module 703 is specifically for judging whether the quantity of feature points is greater than the corresponding adaptive threshold; if the quantity of feature points is greater than the corresponding adaptive threshold, determining that the image frame is a preliminary key frame; and if the quantity of feature points is not greater than the corresponding adaptive threshold, determining that the image frame is not a key frame.

In an embodiment of the present disclosure, the key frame selecting module 703 is for with respect to the preliminary key frame determined, calculating a corresponding relative motion index value by using the relative motion information acquired; judging whether the corresponding relative motion index value of the preliminary key frame is greater than a preset index threshold; if the corresponding relative motion index value of the preliminary key frame is greater than the preset index threshold, determining that the preliminary key frame is a final key frame; and if the corresponding relative motion index value of the preliminary key frame is not greater than the preset index threshold, determining that the preliminary key frame is not a key frame.

Further, the calculating module 702 is specifically for calculating a corresponding relative motion index value by using the relative motion information acquired; and calculating the adaptive threshold currently used according to the relative motion index value, a first constant indicating a relative motion index threshold, and a second constant indicating a feature point quantity threshold.

In an embodiment, the calculation module 702, by using the acquired relative motion information including a position variation and an angle variation, determines a binary function relationship of the relative motion index value related to a third constant, the position variation and the angle variation, and calculates a corresponding relative motion index value.

In an embodiment, the calculation module 702 acquires three-axis acceleration data and three-axis angular velocity data of the smart device, and acquires angular displacement data of the smart device; performs time alignment and spatial alignment on the three-axis acceleration data, the three-axis angular velocity data and the angular displacement data acquired according to a time stamp of the image frame; after the time alignment and spatial alignment, fuses the triaxial acceleration data, the triaxial angular velocity data, the angular displacement data and the image frame using a predetermined filtering algorithm to obtain a pose value corresponding to the image frame, the pose value including position information and angle information; and calculates a difference between the pose value corresponding to the image frame and a pose value of the previous key frame to obtain a position variation and an angle variation from a time point of the previous key frame to a current time point.

In an embodiment, the calculation module 702 acquires collected three-axis acceleration data and three-axis angular velocity data from an inertial measurement unit mounted on the smart device, acquires collected angular displacement data from an encoding disk sensor mounted on the smart device, and acquires collected image frame from a vision sensor mounted on the smart device.

The exemplary illustration of the functions performed by the modules in the device shown in FIG. 7 may refer to the relevant content in the foregoing method embodiments, and will not be repeated herein.

Figure 8:
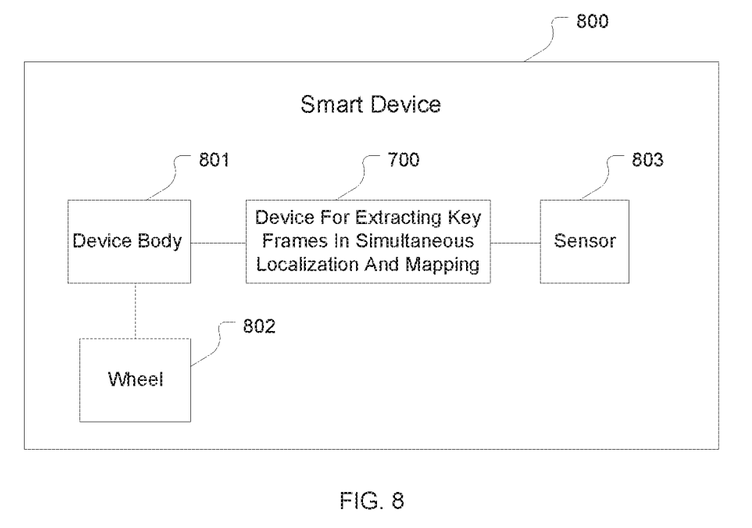
FIG. 8 is a block diagram of a smart device according to an embodiment of the present disclosure.

The present disclosure further provides a smart device. Referring to FIG. 8, the smart device 800 comprises: a device body 801, and the device 700 for extracting key frames in simultaneous localization and mapping as stated above. At least one wheel 802 for moving is mounted at the bottom of the device body 801, and a sensor 803 connected to the key frame extraction device 700 is provided on the device body 801.

The sensor 803 comprises a vision sensor which collects an image of an unknown environment to obtain an image frame, stores the acquired image frame into an image library, and sends a corresponding image frame to the device 700 for extracting key frames in simultaneous localization and mapping. The sensor 803 comprises a motion sensor which acquires relative motion information of the image frame relative to a previous key frame, and sends the relative motion information to the device 700 for extracting key frames in simultaneous localization and mapping.

The steps and functions of the SLAM key frame extraction of the smart device shown in FIG. 8 may refer to the foregoing description of the method and device for extracting key frames in simultaneous localization and mapping, and will not be repeated herein. The description of the present embodiment will focus on the structure of the smart device.

Figure 9:
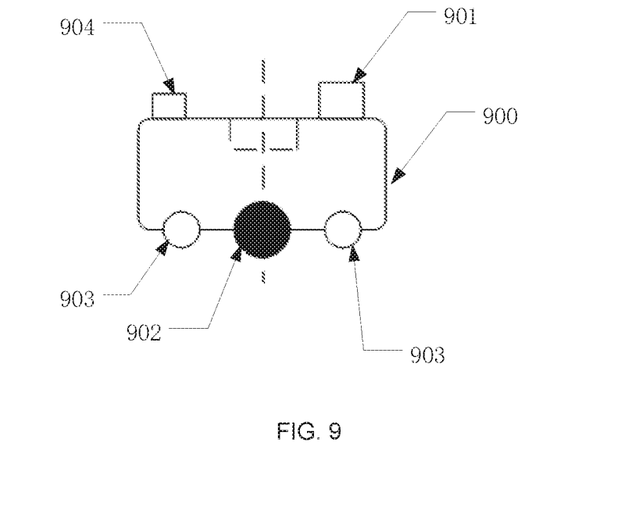
FIG. 9 is a schematic structural diagram of a smart device according to an embodiment of the present disclosure.

Referring to FIG. 9, in an embodiment, the smart device is an intelligent unmanned vehicle, and the device body is a vehicle body 900 having a head and a tail.

The wheels comprise a driving wheel 902 and a driven wheel 903 (two pairs of driven wheels are shown in FIG. 9).

The motion sensor comprises an inertial measurement unit 904 for collecting acceleration information and angular velocity information of motion of the vehicle body, and an encoding disk sensor for collecting angular displacement of motion of the vehicle body.

The inertial measurement unit 904 is mounted on the tail, and a distance from a center of the vehicle body (indicated by a broken line in FIG. 9) to the inertial measurement unit is greater than a predetermined distance threshold.

The encoding disk sensor (see the solid circle in FIG. 9) is mounted on rotating shafts of the driving wheel 902 and the driven wheel 903, and is connected to a driving motor of the rotating shafts.

The vision sensor 901 is mounted at a position on the head where light is not blocked.

As shown in FIG. 9, the intelligent unmanned vehicle of the present embodiment comprises a pair of driving wheels and two pairs of driven wheels front and rear. In the process of simultaneous localization and mapping, image information must be collected as the basis of navigation, so a camera (901, FIG. 9) is mounted at the front part of the unmanned vehicle. The camera mounted at the front part is in order to ensure that the collected image is not blocked. In addition, in order to collect better inertial data, an inertial measurement unit is mounted at the rear part of the vehicle body. The distance between the inertial measurement unit and the center of the vehicle body is greater than a predetermined distance threshold. In other words, the inertial measurement unit should be as far as possible from the center of the vehicle body. The vehicle body is differentially driven by a pair of driving wheels in the middle. An encoding disk is mounted on the driving motor for sending back encoding disk data of a pair of driving wheels.

The smart device of the present embodiment is not limited to an unmanned vehicle, and may be any mobile device capable of simultaneous localization and mapping, such as a drone and a mobile robot.

In sum, the method and device for extracting key frames and the smart device in the embodiments of the present disclosure avoid the problem of key frame redundancy and spatial distribution unevenness of key frames in key frame extraction, which is beneficial to saving system resources and improving the positioning accuracy.

As will be appreciated by a person skilled in the art, embodiments of the present disclosure may be embodied as a system, method or computer program product. Thus, the present disclosure may take the form of an entirely hardware embodiment, an entirely software embodiment, or an embodiment combining software and hardware. Furthermore, the present disclosure may take the form of a computer program product embodied on one or more computer-usable storage media (including but not limited to magnetic storage media, CD-ROMs and optical storage media) having computer-usable program codes recorded thereon.

The present disclosure is described with reference to flowchart illustrations and/or block diagrams of methods, apparatus (systems) and computer program products according to embodiments of the present disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processing apparatus, or other programmable data processing apparatus to produce a machine, such that the instructions, which execute via the processor of the computer or other programmable data processing apparatus, create means for implementing the functions specified in the flowchart and/or block diagram block or blocks.

It should be noted that the terms "comprise", "include" or any other variants are intended to cover non-exclusive inclusion, so that the process, method, article or apparatus including a series of elements may not only include those elements, but may also include other elements not stated explicitly, or elements inherent to the process, method, articles or apparatus. Without more limitations, an element defined by the sentence "comprising a . . . " does not exclude the case that there are other same elements in the process, method, article or apparatus including the element.

The above merely describes particular embodiments of the present disclosure. By the teaching of the present disclosure, a person skilled in the art can make other modifications or variations based on the above embodiments. A person skilled in the art should appreciate that, the detailed description above is only for the purpose of better explaining the present disclosure, and the protection scope of the present disclosure should be subject to the protection scope of the claims.

What is claimed is:

1. A method for extracting key frames in simultaneous localization and mapping, the method comprises:
   acquiring an image frame from an image library storing a plurality of image frames of an unknown environment, and performing feature extraction on the image frame to obtain a quantity of feature points;
   acquiring relative motion information including a position variation and an angle variation of the image frame relative to a previous key frame;
   by using the acquired relative motion information, determining a binary function relationship of a relative motion index value related to a third constant, the position variation, and the angle variation, and calculating and obtaining a corresponding relative motion index value;
   calculating the adaptive threshold currently used according to the relative motion index value, a first constant indicating a relative motion index threshold, and a second constant indicating a feature point quantity threshold;
   selecting a key frame according to the information of feature points and the adaptive threshold indicating space information of image frames,
   wherein acquiring relative motion information of the image frame relative to a previous key frame comprises:
      acquiring three-axis acceleration data and three-axis angular velocity data of a smart device, and acquiring angular displacement data of the smart device;
      performing time alignment and spatial alignment on the three-axis acceleration data, the three-axis angular velocity data and the angular displacement data acquired according to a time stamp of the image frame;
      after the time alignment and spatial alignment, fusing the three-axis acceleration data, the three-axis angular velocity data, the angular displacement data and the image frame using a predetermined filtering algorithm to obtain a pose value corresponding to the image frame, the pose value including position information and angle information; and
      calculating a difference between the pose value corresponding to the image frame and a pose value of the previous key frame to obtain a position variation and an angle variation from a time point of the previous key frame to a current time point,
   wherein:
   acquiring three-axis acceleration data and three-axis angular velocity data of the smart device comprises: acquiring collected three-axis acceleration data and three-axis angular velocity data from an inertial measurement unit mounted on the smart device;
   acquiring angular displacement data of the smart device comprises: acquiring collected angular displacement data from an encoding disk sensor mounted on the smart device;
   acquiring the image frame collected by the smart device comprises: acquiring collected image frame from a vision sensor mounted on the smart device.

2. The method according to claim 1, wherein the method further comprises:
   with respect to the preliminary key frame determined, calculating a corresponding relative motion index value by using the relative motion information acquired;
   judging whether the corresponding relative motion index value of the preliminary key frame is greater than a preset index threshold; and
   when the corresponding relative motion index value of the preliminary key frame is greater than the preset index threshold, determining that the preliminary key frame is a final key frame.

3. The method according to claim 1, wherein selecting a key frame according to the information of feature points and the adaptive threshold indicating space information of image frames comprises:
   judging whether the quantity of feature points is greater than a corresponding adaptive threshold; and
   if the quantity of feature points is greater than the corresponding adaptive threshold, determining that the image frame is a preliminary key frame.

4. A smart device, comprising a device body,
   the smart device is an intelligent unmanned vehicle;
   the device body is a vehicle body having a head and a tail;
   the wheel comprises a driving wheel and a driven wheel,
   wherein at least one wheel for moving is mounted at a bottom of the device body, and a sensor is provided on the device body;
   the sensor comprises a vision sensor which collects an image of an unknown environment to obtain an image frame, stores the acquired image frame into an image library; and
   the sensor comprises a motion sensor which acquires relative motion information of the image frame relative to a previous key frame,
   the motion sensor comprises an inertial measurement unit for collecting acceleration information and angular velocity information of motion of the vehicle body, and an encoding disk sensor for collecting angular displacement of motion of the vehicle body,
   wherein the smart device is configured to:
   acquire the image frame from the image library, and perform feature extraction on the image frame to obtain a quantity of feature points;
   acquire relative motion information including a position variation and an angle variation of the image frame relative to a previous key frame;
   by using the acquired relative motion information, determine a binary function relationship of the relative motion index value related to a third constant, the position variation, and the angle variation, and calculate and obtain a corresponding relative motion index value;
   calculate the adaptive threshold currently used according to the relative motion index value, a first constant indicating a relative motion index threshold, and a second constant indicating a feature point quantity threshold;
   select a key frame according to the information of feature points and the adaptive threshold indicating space information of image frames,
   wherein when acquiring relative motion information including a position variation and an angle variation of the image frame relative to a previous key frame:
   acquire three-axis acceleration data and three-axis angular velocity data of a smart device, and acquire angular displacement data of the smart device;
   perform time alignment and spatial alignment on the three-axis acceleration data, the three-axis angular velocity data and the angular displacement data acquired according to a time stamp of the image frame;

after the time alignment and spatial alignment, fuse the three-axis acceleration data, the three-axis angular velocity data, the angular displacement data and the image frame using a predetermined filtering algorithm to obtain a pose value corresponding to the image frame, the pose value including position information and angle information; and calculate a difference between the pose value corresponding to the image frame and a pose value of the previous key frame to obtain a position variation and an angle variation from a time point of the previous key frame to a current time point, when acquiring three-axis acceleration data and three-axis angular velocity data of the smart device, acquire collected three-axis acceleration data and three-axis angular velocity data from an inertial measurement unit mounted on the smart device;

when acquiring angular displacement data of the smart device, acquire collected angular displacement data from an encoding disk sensor mounted on the smart device; and when acquiring the image frame collected by the smart device, acquire collected image frame from a vision sensor mounted on the smart device.

5. The smart device according to claim 4, wherein the inertial measurement unit is mounted on the tail, and a distance from a center of the vehicle body to the inertial measurement unit is greater than a predetermined distance threshold.

6. The smart device according to claim 4, wherein the encoding disk sensor is mounted on rotating shafts of the driving wheel and the driven wheel, and is connected to a driving motor of the rotating shafts.

7. The smart device according to claim 4, wherein the vision sensor is mounted at a position on the head where light is not blocked.

* * * * *